United States Patent
Kroupenkine et al.

(10) Patent No.: US 7,227,235 B2
(45) Date of Patent: Jun. 5, 2007

(54) ELECTROWETTING BATTERY HAVING A NANOSTRUCTURED ELECTRODE SURFACE

(75) Inventors: Timofei Nikita Kroupenkine, Warren, NJ (US); Joseph Ashley Taylor, Springfield, NJ (US); Donald Weiss, Cresskill, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/716,084

(22) Filed: Nov. 18, 2003

(65) Prior Publication Data

US 2005/0106459 A1    May 19, 2005

(51) Int. Cl.
*H01M 4/60* (2006.01)

(52) U.S. Cl. .................. 257/400; 257/551; 257/565; 429/213; 429/231.11; 429/118; 429/66; 429/120; 429/62; 429/112; 429/129; 429/232; 429/245; 429/50; 429/233; 429/235; 429/210

(58) Field of Classification Search .............. 257/396, 257/397, 398, 399, 400, 402, 403, 49
See application file for complete search history.

(56) References Cited

U.S. PATENT DOCUMENTS

| | | | |
|---|---|---|---|
| 4,569,575 A | 2/1986 | Le Pesant et al. | 350/355 |
| 4,749,198 A | 6/1988 | Brailean | 273/416 |
| 5,254,415 A * | 10/1993 | Williams et al. | 429/153 |
| 6,231,744 B1 | 5/2001 | Ying et al. | 205/324 |
| 6,911,280 B1 * | 6/2005 | De Jonghe et al. | 429/137 |
| 2003/0027613 A1 * | 2/2003 | Hasebe et al. | 463/2 |

FOREIGN PATENT DOCUMENTS

WO    WO 02/101352    12/2002

OTHER PUBLICATIONS

European Search Report dated Mar. 16, 2005.
Kim, et al., "Nanostructured Surfaces for Dramatic Reduction of Flow Resistance in Droplet-Based Microfluidics," IEEE, pp. 479-482 (2002).
U.S. Appl. No. 10/798,064, filed Mar. 11, 2004, Arney et al.
U.S. Appl. No. 10/806,543, filed Mar. 23, 2004, Arney et al.

(Continued)

*Primary Examiner*—Evan Pert
*Assistant Examiner*—Fazli Erdem
(74) *Attorney, Agent, or Firm*—Donald P. Dinella

(57) ABSTRACT

A method and apparatus are disclosed wherein a battery comprises an electrode having at least one nanostructured surface. The nanostructured surface is disposed in a way such that an electrolyte fluid of the battery is prevented from contacting the electrode, thus preventing discharge of the battery when the battery is not in use. When a voltage is passed over the nanostructured surface, the electrolyte fluid is caused to penetrate the nanostructured surface and to contact the electrode, thus activating the battery. In one illustrative embodiment, the battery is an integrated part of an electronics package. In another embodiment, the battery is manufactured as a separate device and is then brought into contact with the electronics package. In yet another embodiment, the electronics package and an attached battery are disposed in a projectile that is used as a military targeting device.

11 Claims, 8 Drawing Sheets

OTHER PUBLICATIONS

U.S. Appl. No. 10/816,569, filed Apr. 1, 2004, Gasparyan et al.
U.S. Appl. No. 10/674,448, filed Sep. 30, 2003, Hodes et al.
U.S. Appl. No. 10/803,565, filed Mar. 18, 2004, Hodes et al.
U.S. Appl. No. 10/803,641, filed Mar. 18, 2004, Hodes et al.
U.S. Appl. No. 10/403,159, filed Mar. 31, 2003, Kornblit et al.
U.S. Appl. No. 10/649,285, filed Aug. 27, 2003, Kornblit et al.
U.S. Appl. No. 10/716,084, filed Nov. 18, 2003, Kroupenkine et al.
U.S. Appl. No. 10/803,576, filed Mar. 18, 2004, Kroupenkine et al.
U.S. Appl. No. 10/810,774, filed Mar. 26, 2004, Kroupenkine et al.

* cited by examiner 401
402

601
602
502

ELECTROWETTING BATTERY HAVING A NANOSTRUCTURED ELECTRODE SURFACE

FIELD OF THE INVENTION

The present invention relates generally to batteries and, more particularly, to batteries having at least one nanostructured electrode surface.

BACKGROUND OF THE INVENTION

Many beneficial devices or structures in myriad applications rely on batteries as a power source. As shown in FIG. 1, illustrative liquid-cell battery 101, is characterized by an electrolyte liquid 102 which provides a mechanism for an electrical charge to flow in direction 103 between a positive electrode 104 and a negative electrode 105. When such a battery 101 is inserted into an electrical circuit 106 with illustrative load 108, it completes a loop which allows electrons to flow uniformly in direction 107 around the circuit 106. The positive electrode thus receives electrons from the external circuit 106. These electrons then react with the materials of the positive electrode 104 in reduction reactions that generate the flow of a charge to the negative electrode 105 via ions in the electrolyte liquid 102. At the negative electrode 105, oxidation reactions between the materials of the negative electrode 104 and the charge flowing through the electrolyte fluid 102 result in surplus electrons that are released to the external circuit 106.

As the above process continues, the active materials of the positive and negative electrodes 104 and 105, respectively, eventually become depleted and the reactions slow down until the battery is no longer capable of supplying electrons. At this point the battery is discharged. It is well known that, even when a liquid-cell battery is not inserted into an electrical circuit, there is often a low level reaction with the electrodes 104 and 105 that can eventually deplete the material of the electrodes. Thus, a battery can become depleted over a period of time even when it is not in active use in an electrical circuit. This period of time will vary depending on the electrolyte fluid used and the materials of the electrodes.

SUMMARY OF THE INVENTION

We have realized that it would be extremely advantageous to be able to prevent the discharge of batteries while the batteries are not in use. Additionally, it would be advantageous to be able to variably control when the discharge of the batteries was initiated.

Therefore, we have invented a method and apparatus wherein a battery comprises an electrode having at least one nanostructured surface. The nanostructured surface is disposed in a way such that an electrolyte fluid of the battery is prevented from contacting the electrode, thus preventing discharge of the battery when the battery is not in use. When a voltage is passed over the nanostructured surface, the electrolyte fluid is caused to penetrate the nanostructured surface and to contact the electrode, thus activating the battery. Accordingly, when the activated battery is inserted into an electrical circuit, electrons will flow along the circuit.

In one illustrative embodiment, the battery is an integrated part of an electronics package. In another embodiment, the battery is manufactured as a separate device and is then brought into contact with the electronics package. In yet another embodiment, the electronics package and an attached battery are disposed in a projectile that is used as a military targeting device.

DETAILED DESCRIPTION

Figure 2:
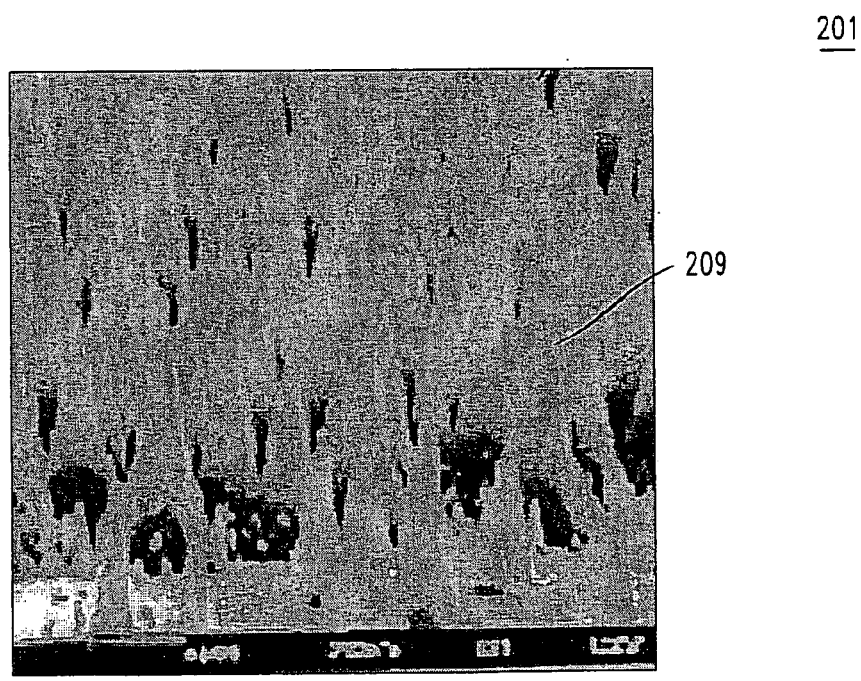
FIG. 2 shows a prior art nanopost surface.

FIG. 2 shows an illustrative nanopost pattern 201 with each nanopost 209 having a diameter of less than 1 micrometer. While FIG. 2 shows nanoposts 209 formed in a somewhat conical shape, other shapes and sizes are also achievable. In fact, cylindrical nanopost arrays have been produced with each nanopost having a diameter of less than 10 nm. Specifically, FIGS. 3A-3E show different illustrative arrangements of nanoposts produced using various methods and further show that such various diameter nanoposts can be fashioned with different degrees of regularity. Moreover, these figures show that it is possible to produce nanoposts having various diameters separated by various distances. An illustrative method of producing nanoposts, found in U.S. Pat. No. 6,185,961, titled "Nanopost arrays and process for making same," issued Feb. 13, 2001 to Tonucci, et al, is hereby incorporated by reference herein in its entirety. Nanoposts have been manufactured by various methods, such as by using a template to form the posts, by various means of lithography, and by various methods of etching.

Figure 3A:
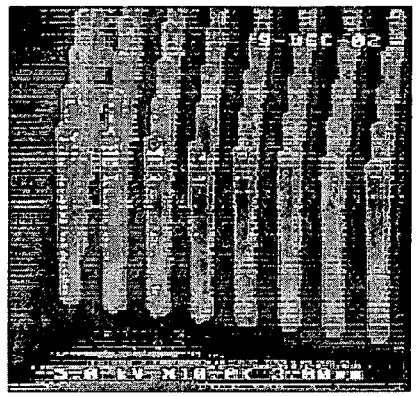
FIGS. 3A, 3B, 3C, 3D and 3E show various prior art nanostructure feature patterns of predefined nanostructures that are suitable for use in the present invention.
Figure 3B:
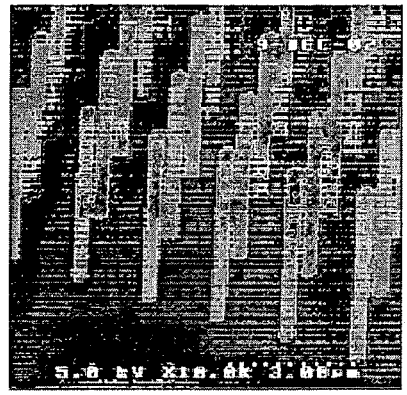
Figure 3C:
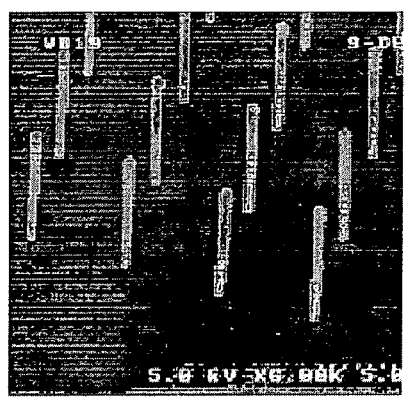
Figure 3D:
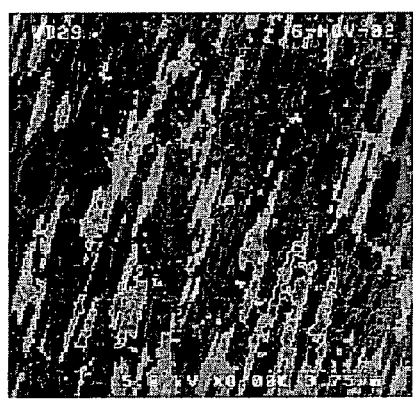
Figure 3E:
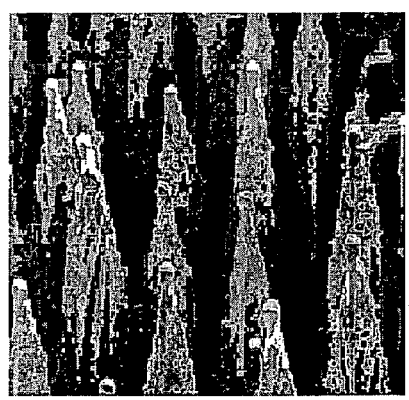
Figure 4:
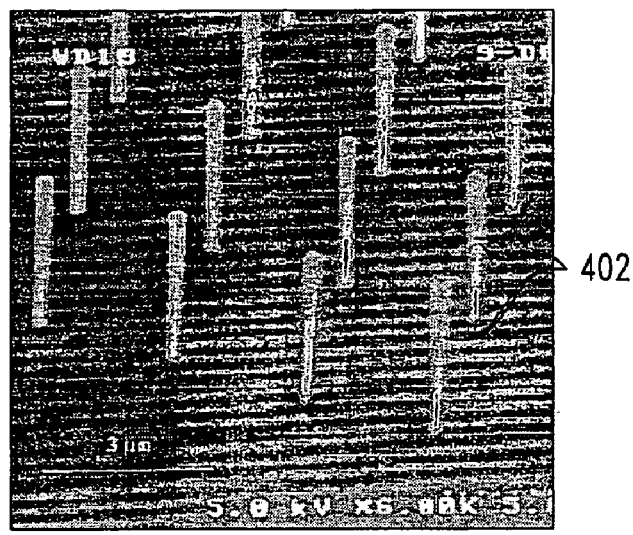
FIG. 4 shows a more detailed view of the prior art nanostructure feature pattern of FIG. 3C.

FIG. 4 shows the illustrative known surface 401 of FIG. 3C with a nanostructure feature pattern of nanoposts 402 disposed on a substrate. Throughout the description herein, one skilled in the art will recognize that the same principles applied to the use of nanoposts or nanostructures can be equally applied to microposts or other larger features in a feature pattern. The surface 401 and the nanoposts 402 of FIG. 4 are, illustratively, made from silicon. The nanoposts 402 of FIG. 4 are illustratively approximately 350 nm in diameter, approximately 6 µm high and are spaced approximately 4 µm apart, center to center. It will be obvious to one skilled in the art that such arrays may be produced with regular spacing or, alternatively, with irregular spacing.

As used herein, unless otherwise specified, a "nanostructure" is a predefined structure having at least one dimension of less than one micrometer and a "microstructure" is a predefined structure having at least one dimension of less than one millimeter. The term "feature pattern" refers to either a pattern of microstructures or a pattern of nanostructures. Further, the terms "liquid," "droplet," and "liquid droplet" are used herein interchangeably. Each of those terms refers to a liquid or a portion of liquid, whether in droplet form or not.

Figure 5A:
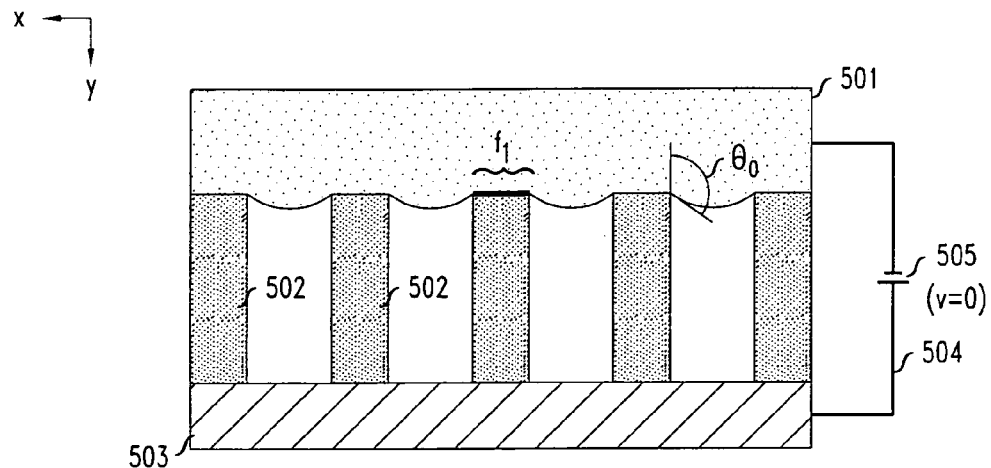
FIGS. 5A and 5B show a device in accordance with the principles of the present invention whereby electrowetting principles are used to cause a liquid droplet to penetrate a nanostructure feature pattern.
Figure 5B:
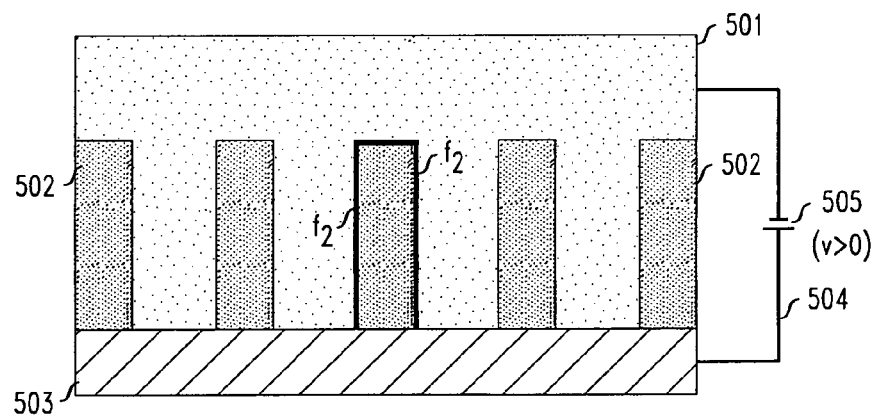

The present inventors have recognized that it is desirable to be able to control the penetration of a given liquid into a given nanostructured or microstructured surface and, thus, control the contact of the liquid with the underlying substrate supporting the nanostructures or microstructures. FIGS. 5A and 5B show one embodiment in accordance with the principles of the present invention where electrowetting is used to control the penetration of a liquid into a nanostructured surface. Electrowetting principles are generally described in U.S. patent application Ser. No. 10/403,159 filed Mar. 31, 2003 and titled "Method And Apparatus For Variably Controlling The Movement Of A Liquid On A Nanostructured Surface,"-which is hereby incorporated by reference herein in its entirety.

Figure 6:
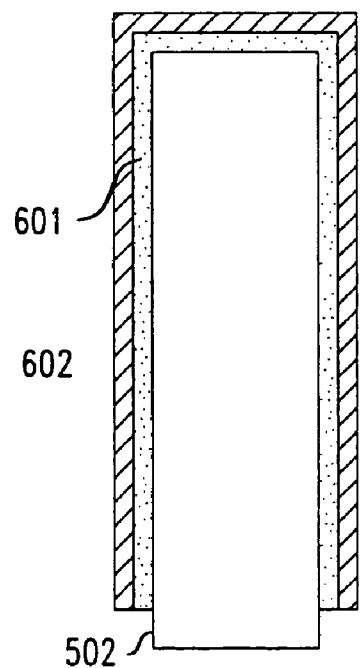
FIG. 6 shows the detail of an illustrative nanopost of the nanostructure feature pattern of FIGS. 5A and 5B.

Referring to FIG. 5A, a droplet 501 of conducting liquid (such as an electrolyte solution in a liquid-cell battery) is disposed on nanostructure feature pattern of cylindrical nanoposts 502, as described above, such that the surface tension of the droplet 501 results in the droplet being suspended on the upper portion of the nanoposts 502. In this arrangement, the droplet only covers surface area $f_1$ of each nanopost. The nanoposts 502 are supported by the surface of a conducting substrate 503. Droplet 501 is illustratively electrically connected to substrate 503 via lead 504 having voltage source 505. An illustrative nanopost is shown in greater detail in FIG. 6. In that figure, nanopost 502 is electrically insulated from the liquid (501 in FIG. 5A) by material 601, such as an insulating layer of dielectric material. The nanopost is further separated from the liquid by a low surface energy material 602, such as a well-known fluoro-polymer. Such a low surface energy material allows one to obtain an appropriate initial contact angle between the liquid and the surface of the nanopost. It will be obvious to one skilled in the art that, instead of using two separate layers of different material, a single layer of material that possesses sufficiently low surface energy and sufficiently high insulating properties could be used.

FIG. 5B shows that, by applying a low voltage (e.g., 10-20 volts) to the conducting droplet of liquid 501, a voltage difference results between the liquid 501 and the nanoposts 502. The contact angle between the liquid and the surface of the nanopost decreases and, at a sufficiently low contact angle, the droplet 501 moves down in the y-direction along the surface of the nanoposts 502 and penetrates the nanostructure feature pattern until it complete surrounds each of the nanoposts 502 and comes into contact with the upper surface of substrate 503. In this configuration, the droplet covers surface area $f_2$ of each nanopost. Since $f_2 \gg f_1$, the overall contact area between the droplet 501 and the nanoposts 502 is relatively high such that the droplet 501 contacts the substrate 503.

Figure 7:
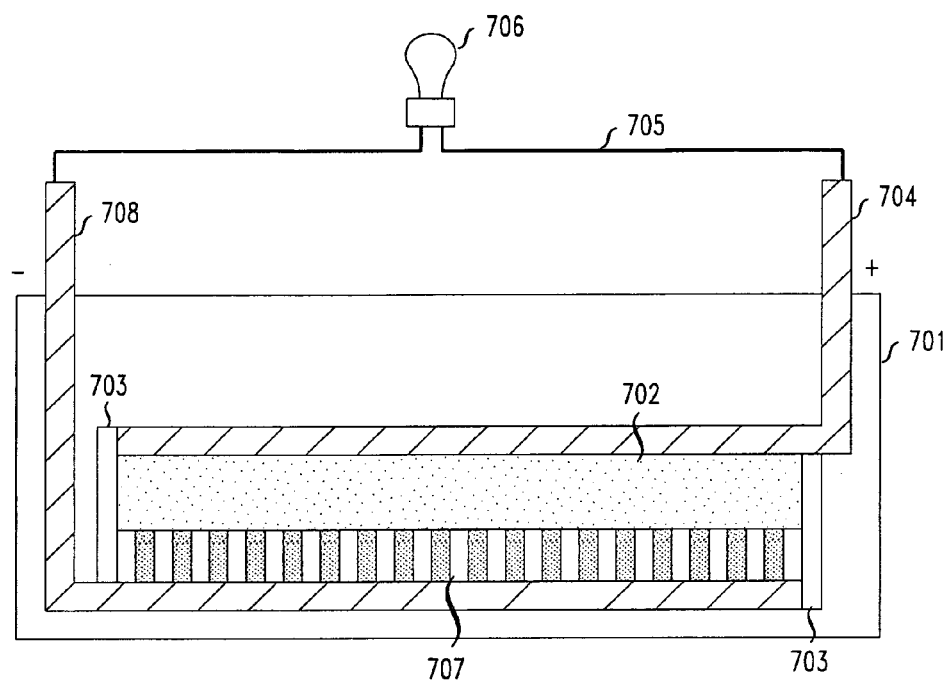
FIG. 7 shows an illustrative liquid-cell battery in accordance with the principles of the present invention wherein the electrolyte in the battery is separated from the negative electrode by nanostructures.

FIG. 7 shows an illustrative battery 701 in accordance with the principles of the present invention whereby an electrolyte fluid 702 is contained within a housing having containment walls 703. The electrolyte fluid 702 is in contact with positive electrode 704, but is separated from negative electrode 708 by nanostructured surface 707. Nanostructured surface 707 may be the surface of the negative electrode or, alternatively, may be a surface bonded to the negative electrode. One skilled in the art will recognize that the nanostructured surface could also be used in association with the positive electrode with similarly advantageous results. In FIG. 7, the electrolyte fluid is suspended on the tops of the nanoposts of the surface, similar to the droplet of FIG. 5A. The battery 701 is inserted, for example, into electrical circuit 705 having load 706. When the electrolyte liquid is not in contact with the negative electrode, there is substantially no reaction between the electrolyte and the electrodes 704 and 705 of the battery 701 and, therefore, there is no depletion of the materials of the electrodes. Thus, it is possible to store the battery 701 for relatively long periods of time without the battery becoming discharged.

Figure 8:
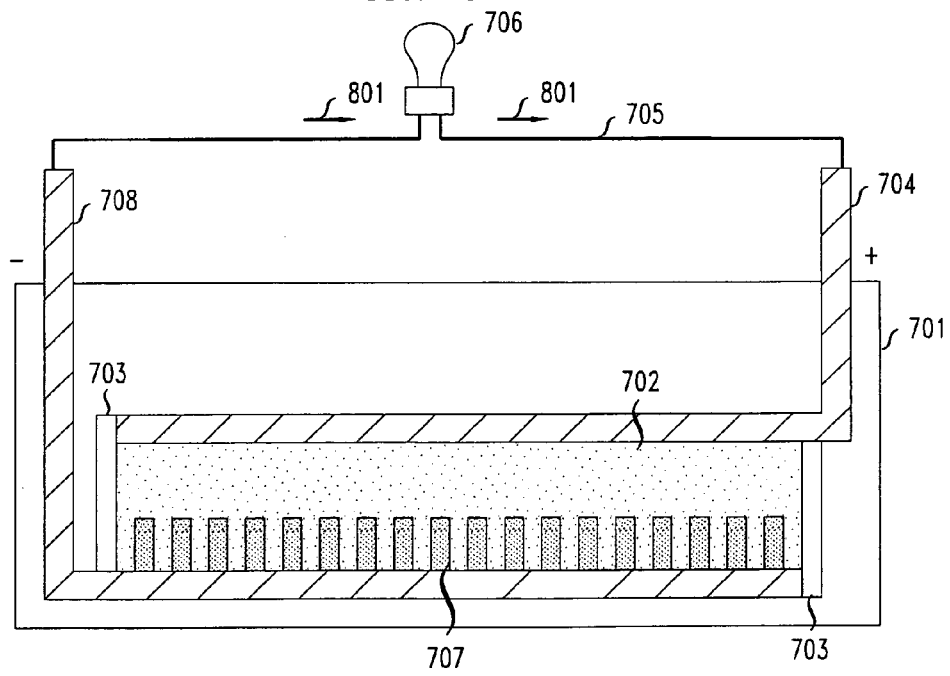
FIG. 8 shows the illustrative battery of FIG. 7 wherein the electrolyte in the battery is caused to penetrate the nanostructures and to thus contact the negative electrode.

FIG. 8 shows the battery 701 of FIG. 7 inserted into electrical circuit 705 wherein, utilizing the electrowetting principles described above, a voltage is passed over the nanostructured surface 707 thus causing the electrolyte fluid 702 to penetrate the surface 707 and to come into contact with the negative electrode 708. One skilled in the art will recognize that this voltage can be generated from any number of sources such as, for example, by passing one or more pulses of RF energy through the battery. When the penetration of the electrolyte into the nanostructures occurs, electrons begin flowing in direction 801 along the circuit 705 as described above and the load 706 is powered. Thus, the embodiment of FIGS. 7 and 8 show how a battery can be stored without depletion for a relatively long period of time and can then be "turned on" at a desired point in time to power one or more electrical loads in an electrical circuit.

Figure 9A:
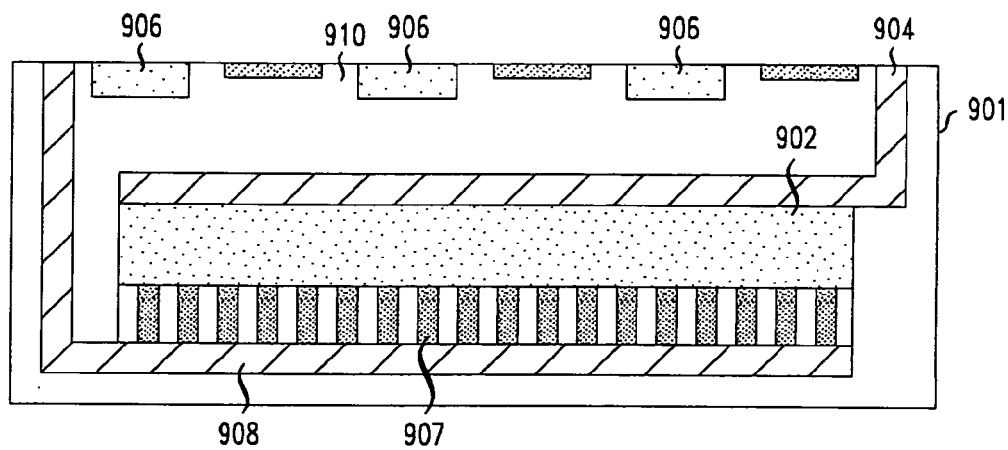
FIGS. 9A and 9B show an illustrative embodiment of the use of the battery of FIGS. 7 and 8, respectively, in an electrical circuit having one or more lasers.
Figure 9B:
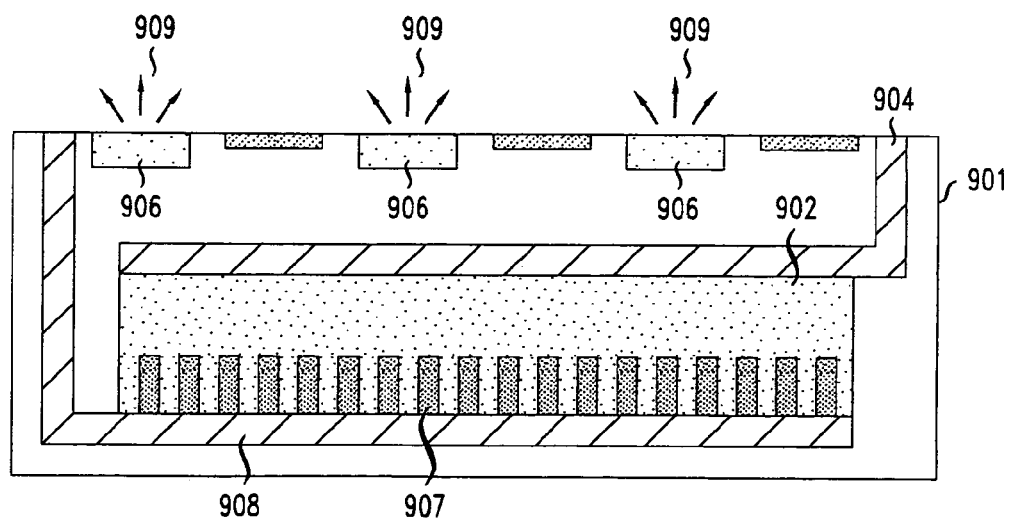

FIGS. 9A and 9B show a cross section of an illustrative use of the battery of FIGS. 7 and 8 in a small electronics package 901. Specifically, referring to FIG. 9A, package 901 has a battery portion (having a positive electrode 904, negative electrode 908, nanostructured surface 907, and electrolyte fluid 902) electrically connected to an illustrative laser portion (having lasers 906). One skilled in the art will recognize that package 901 may be an integrated device formed entirely from one material, such as a silicon wafer or, alternatively, the battery portion may be formed separately and later connected in the manufacturing process to the laser portion of the package 901. The package 901 shown in cross-section in FIGS. 9A and 9B can be illustratively manufactured as a device of any size in any desired geometric shape (e.g., a square, circle, rectangle, etc). Advantageously, the package 901 may be manufactured such that surface 910 has a surface area of 1 mm$^2$ to 100 mm$^2$. One skilled in the art will recognize that a variety of shapes having a variety of surface areas will be advantageous in various applications.

As described previously, referring to FIG. 9B, when a voltage is passed over nanostructured surface 907, the electrolyte fluid 902 penetrates the surface 907 and contacts electrode 908. Once again, this voltage can be generated by an RF pulse generated external to the battery. Reactions between the electrodes 904 and 908 begin and an electrical current begins flowing along the electrical circuit connecting the battery to the lasers 906. Thus, lasers 906 begin emitting light.

Figure 1:
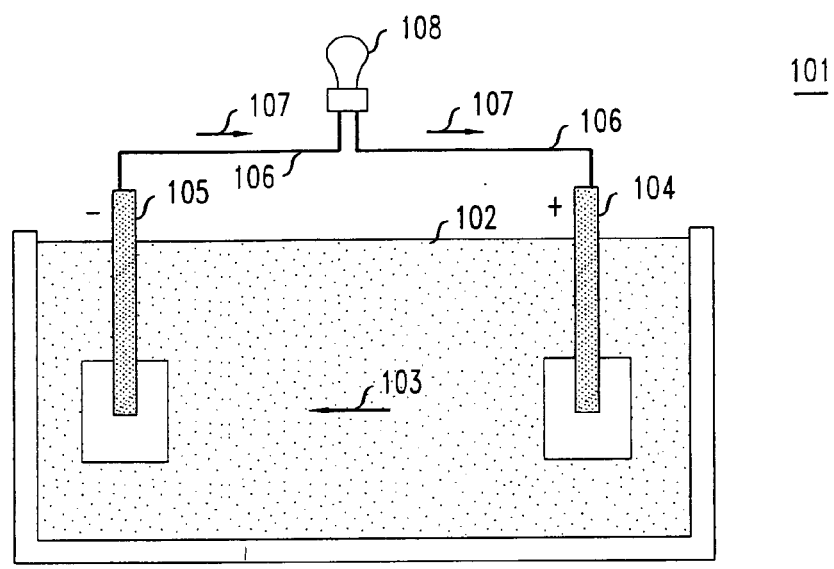
FIG. 1 shows a prior art liquid-cell battery as used in an electrical circuit.
Figure 10:
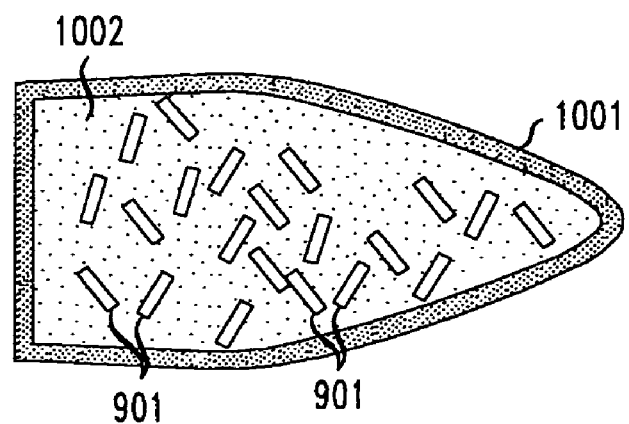
FIGS. 10A and 10B show how a plurality of the devices of the illustrative embodiment of FIGS. 9A and 9B can be disposed in a container, such as a projectile.
Figure 10:
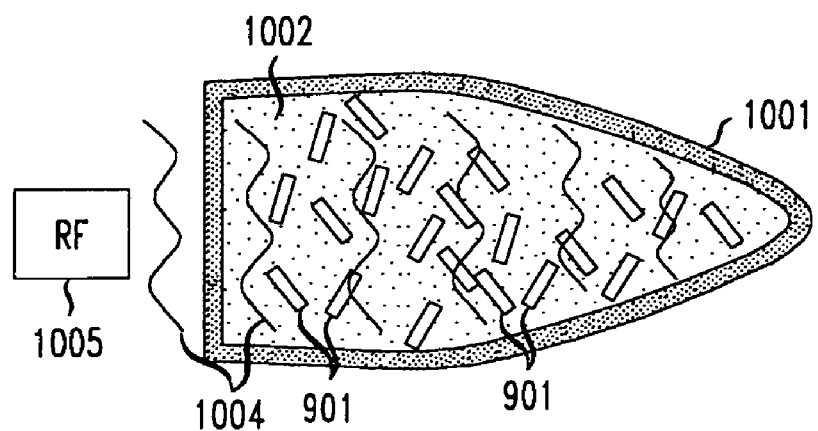
Figure 11:
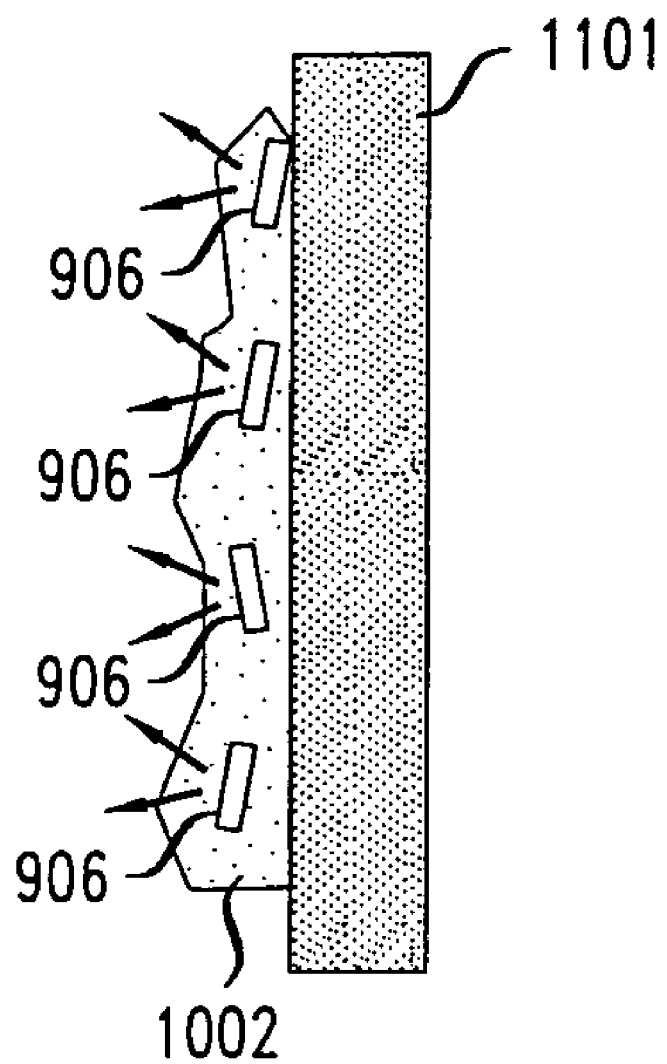
FIG. 11 shows how the projectiles of FIGS. 10A and 10B can be used as a laser designate targets.

FIGS. 10A and 10B and 11 show one illustrative use for the electronics package of FIGS. 9A and 9B. Specifically, referring to FIG. 1A, a container 1001, such as a projectile, is filled with an adhesive liquid 1002 in which a plurality of the electronics packages 901 of FIGS. 9A and 9B are disposed. The adhesive liquid is illustratively a gel that has a long shelf life (i.e., having a viscosity that will not change over a relatively long period of time) and which functions to maintain a separation distance between the plurality of electronics packages 901. The projectile is, illustratively, formed from a polymeric material such as a common PVC or ABS plastic material. An illustrative liquid suitable for use in the embodiment of FIGS. 10A and 10B is a soft adhesive in the urethane-based elastomeric adhesive family. Prior to being used, the battery portions of the electronics packages 901 are not active and the lasers do not emit light, similar to the embodiment of FIG. 9A as described above. However, referring to FIG. 10B, when it is desired that the lasers begin to emit light, device 1005 generates one or more RF energy pulses 1004 that are passed through the container 1001, thus passing a voltage over the nanostructured surfaces 907 of FIG. 9B and causing the electrolyte in the batteries of packages 901 to contact both electrodes 904 and 908 of FIG. 9B. Accordingly, as in the embodiment of FIG. 9B, lasers 906 begin to emit light. One skilled in the art will recognize that, if the projectile of FIGS. 10A and 10B is a projectile fired from a gun, device 1005 may be a component of the gun that generates RF pulses to activate the lasers of the packages 901. As used herein, gun is defined as a handgun, a rifle, a cannon, slingshot or any other such device suitable for launching a projectile toward a target. Alternatively, for example where the projectile is thrown by hand, any suitable RF energy-generating device may be used to active the lasers of the electronics packages 901.

FIG. 11 shows how, when the projectile 1001 of FIGS. 10A and 10B contacts a surface 1101, illustratively the surface of a vehicle, the projectile breaks apart and the liquid 1002 adheres to the surface 1101. Hence, the light emitting packages 901 within the liquid also adhere to the surface 1101 of the vehicle. Some military ordnance, particularly bombs and/or missiles dropped from airborne platforms, are adapted to home into laser light of a particular frequency. One skilled in the art will therefore recognize that the light-emitting packages 906 can thus be used as a military laser targeting device that these bombs or missiles can home into. One skilled in the art will also recognize that this form of laser targeting device have advantages over currently-used laser targeting systems. For example, one current system relies on manual "painting" of a target with a laser. In this case, a person on the ground must remain in proximity with the target and shine a laser onto the target, thus placing the person in jeopardy of being discovered or injured. Another current system relies on an aircraft to paint the target with the laser. However, this requires the aircraft to once again remain in the proximity of the target until the bomb or missile strikes the target. This is similarly undesirable.

The projectiles of FIGS. 10A and 10B have the advantage that they can be fired at a vehicle and act as self-generating laser emitters. Thus neither a person nor an aircraft is required to paint the target with a laser. Additionally, one skilled in the art will recognize that the laser emitters of FIGS. 10A and 10B do not have to be activated prior to firing the projectile. Instead, the projectiles may be fired and the inactive emitters attached to a surface 1101, as shown in FIG. 11. Then, at a later time an RF energy pulse can be generated by any suitable source that will activate the laser emitters. One skilled in the art will also recognize that different laser signals can be emitted by the laser packages in different projectiles, such as by using different encryption of the signals, thus allowing target differentiation by different ordnance.

The foregoing merely illustrates the principles of the invention. It will thus be appreciated that those skilled in the art will be able to devise various arrangements which, although not explicitly described or shown herein, embody the principles of the invention and are within its spirit and scope. For example, one skilled in the art, in light of the descriptions of the various embodiments herein, will recognize that the principles of the present invention may be utilized in widely disparate fields and applications. All examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

What is claimed is:

1. Apparatus for variably controlling a discharge of a battery, said apparatus comprising:
   an electrolyte fluid;
   a first electrode; and
   a nanostructured surface between said electrolyte fluid and said electrode for variably controlling a penetration of said electrolyte fluid into said nanostructured surface, said nanostructured surface comprising a plurality of nanostructures, each nanostructure having at least one dimension of less than one micrometer, said penetration being variably controlled as function of passing a voltage over said nanostructured surface such that prior to said passing of said voltage over said nanostructured surface said electrolyte fluid is suspended on said plurality of nanostructures thereby preventing contact of said electrolyte fluid with said first electrode, and upon said passing of said voltage over said nanostructured surface said electrolyte fluid is caused to penetrate said nanostructured surface and come in contact with said first electrode.

2. The apparatus of claim 1 wherein there is substantially no reaction between said electrolyte fluid, said first electrode and a second electrode integral with said battery, thereby preventing said discharge of said battery.

3. The apparatus of claim 1 wherein said suspension of said electrolyte fluid on said nanostructures is a result of surface tension between said electrolyte fluid and said nanostructures.

4. The apparatus of claim 3 wherein said discharge of said battery is initiated by controlling said penetration of said electrolyte fluid into said nanostructured surface.

5. Apparatus comprising:
   an electrolyte fluid;
   a first electrode;
   a nanostructured surface between said electrolyte fluid and said first electrode for variably controlling a penetration of said electrolyte fluid into said nanostructured surface, said nanostructured surface comprising a plurality of nanostructures, each nanostructure having at least one dimension of less than one micrometer, said penetration being variably controlled as function of passing a voltage over said nanostructured surface such that prior to said passing of said voltage over said nanostructured surface said electrolyte fluid is suspended on said plurality of nanostructures thereby preventing contact of said electrolyte fluid with said first electrode, and upon passing said voltage over said nanostructured surface said electrolyte fluid is caused to penetrate said nanostructured surface and come in contact with said first electrode; and a second electrode in contact with said electrolyte fluid disposed in a way such that, when said electrolyte fluid penetrates said nanostructured surface and comes in contact with said first electrode, a battery capable of generating an electrical current is formed.

6. The apparatus of claim 5 wherein said suspension of said electrolyte fluid on said nanostructures is a result of surface tension between said electrolyte fluid and said nanostructures.

7. The apparatus of claim 6 wherein a discharge of said battery is initiated by controlling said penetration of said electrolyte into said nanostructured surface.

8. Apparatus comprising:

an electrolyte fluid;

a first electrode;

a nanostructured surface between said electrolyte fluid and said first electrode for variably controlling a penetration of said electrolyte fluid into said nanostructured surface, said nanostructured surface comprising a plurality of nanostructures, each nanostructure having at least one dimension of less than one micrometer, said penetration being variably controlled as function of passing a voltage over said nanostructured surface such that prior to said passing of said voltage over said nanostructured surface said electrolyte fluid is suspended on said plurality of nanostructures thereby preventing contact of said electrolyte fluid with said first electrode, and upon said passing of said voltage over said nanostructured surface said electrolyte fluid is caused to penetrate said nanostructured surface and come in contact with said first electrode;

an electrical circuit comprising an electrical load; and a second electrode in contact with said electrolyte fluid disposed in a way such that, when said electrolyte fluid penetrates said nanostructured surface and comes in contact with said first electrode, a battery capable of generating an electrical current is formed to power said electrical load.

9. Apparatus comprising:

an electrolyte fluid;

a first electrode;

a nanostructured surface between said electrolyte fluid and said first electrode for variably controlling a penetration of said electrolyte fluid into said nanostructured surface, said nanostructured surface comprising a plurality of nanostructures, each nanostructure having at least one dimension of less than one micrometer, said penetration being variably controlled as function of passing a voltage over said nanostructured surface such that prior to said passing of said voltage over said nanostructured surface said electrolyte fluid is suspended on said plurality of nanostructures thereby preventing contact of said electrolyte fluid with said first electrode, and upon said passing of said voltage over said nanostructured surface said electrolyte fluid is caused to penetrate said nanostructured surface and comes in contact with said first electrode;

an electrical circuit comprising an electrical load, wherein said electrical load is at least one laser; and a second electrode in contact with said electrolyte fluid disposed in a way such that, when said electrolyte fluid penetrates said nanostructured surface and comes in contact with said first electrode, a battery capable of generating an electrical current is formed to power said electrical load.

10. The apparatus of claim 9 wherein said suspension of said electrolyte fluid on said nanostructures is a result of surface tension between said electrolyte fluid and said nanostructures.

11. The apparatus of claim 10 wherein a discharge of said battery is initiated by controlling said penetration of said electrolyte into said nanostructured surface, and said voltage is generated by an RF pulse generated external to said battery.

* * * * *